No. 731,755. PATENTED JUNE 23, 1903.
G. H. CONDICT.
VEHICLE RUNNING GEAR.
APPLICATION FILED JAN. 19, 1903.
NO MODEL.
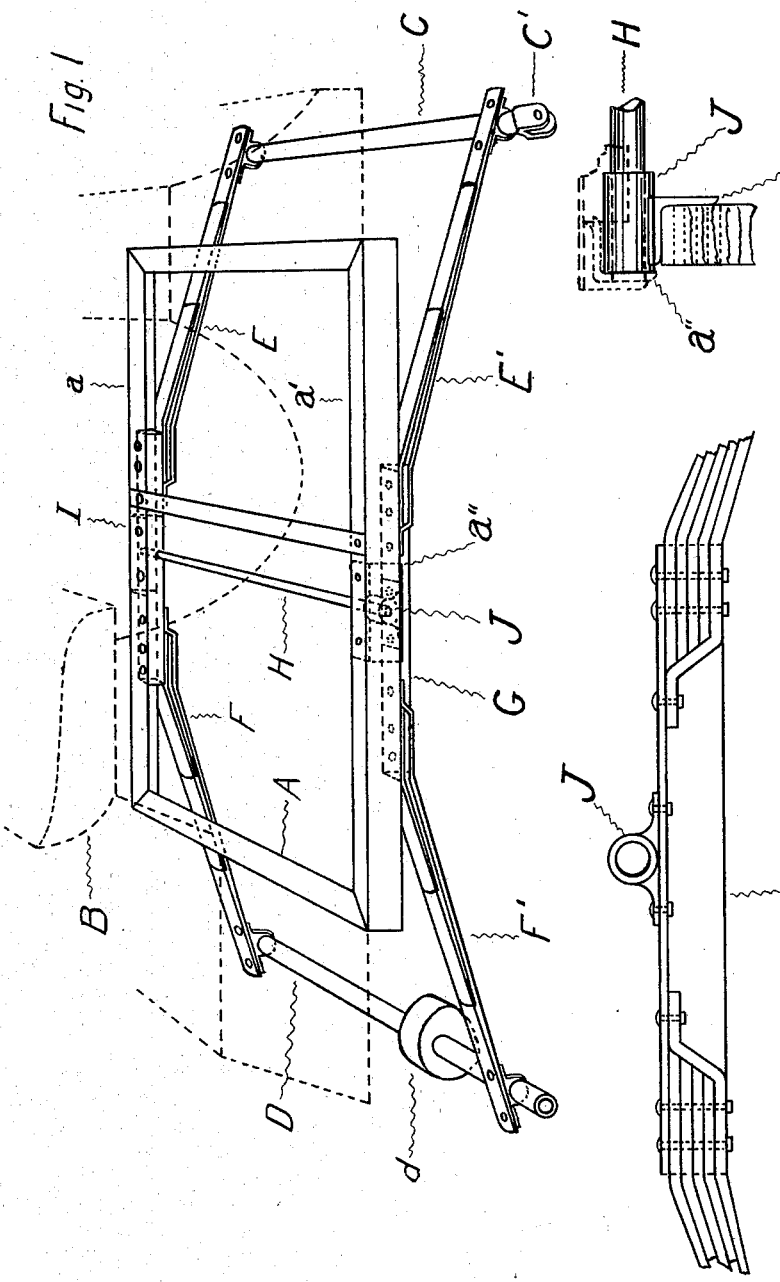
Witnesses.
M. L. Clark
Rudolph Riege
Inventor.
George H. Condict,
by Hermann F. Cuntz
attorney.

No. 731,755.

Patented June 23, 1903.

UNITED STATES PATENT OFFICE.

GEORGE HERBERT CONDICT, OF NEW YORK, N. Y.

VEHICLE RUNNING-GEAR.

SPECIFICATION forming part of Letters Patent No. 731,755, dated June 23, 1903.

Application filed January 19, 1903. Serial No. 139,549. (No model.)

*To all whom it may concern:*

Be it known that I, GEORGE HERBERT CONDICT, a citizen of the United States, and a resident of the borough of Manhattan, in the city of New York, State of New York, have invented certain new and useful Improvements in Running-Gears, of which the following is a specification.

This invention relates to vehicles, and more particularly to the construction of running-gear for vehicles, especially those used in motor-vehicles, where the parts are comparatively heavier than ordinary vehicles, while the added mechanism embodied in the vehicles is such as to make straining of parts most undesirable.

The main object of the invention is to produce a running-gear that will permit a large amount of warpability or flexibility in the wheel-base without distorting the body or frame supporting the body or propelling mechanism, as well as other objects which will hereinafter appear.

In carrying out the construction the aim is to produce a light, simple, and at the same time strong construction with the objects above mentioned, as well as advantages mentioned more in detail hereinafter.

In the drawings forming a part of this specification, Figure 1 is a side perspective view of a running-gear, wheels omitted, with the position of the superimposed body shown in dotted lines. Fig. 2 is a side elevation, on larger scale, of the middle portion of the spring system on one side. Fig. 3 is an end view of Fig. 2, showing in dotted lines the position of the adjacent frame portion in section.

The frame A, which I have shown as a rectangular level construction of angle-irons, is made of reasonable rigidity and adapted to support a body, which I have shown dotted, as B.

The front axle C carries at either end individually-pivoted steering-wheels in brackets C' C', while a rear axle member D carries at its end driving-wheels. (Not shown.) This axle, as shown, is a casing with a protuberance $d$, which may inclose a balance-gear of any desired form and a driving member to transmit motion to a parted axle connected with the wheels at the extremity of the axle member D. Springs E and E' and F and F' extend, respectively, from the front axle and from the rear axle, inclined upwardly toward the frame A, each being secured to its respective axle near one end. The springs E and F are attached rigidly to one side of the frame longitudinal member $a$, while E' and F' are not attached rigidly to the frame, but are firmly secured to a stout member G, which in the embodiment shown consists of an angle-iron which is pivotally mounted on the side member of the frame $a'$. In the embodiment shown the forward ends of the springs E and E' and the rearward ends of springs F and F' are attached to their respective axles rigidly.

Extending from side to side of the frame A near its middle is a bar H, which passes through a bearing J in the pivoted member G, affording a swivel therefor. This bar H is securely held in the block I on the side of the frame, to which springs E and F are rigidly attached. The block I is of a height sufficient to compensate for the distance between the frame and the oscillating member G on the other side of the vehicle, so that the two systems of springs on either side of the vehicle are seated on the same level. The end of bar H on the same side of the vehicle as spring system E' F' passes through a bearing J, attached to member G, and projecting beyond it outwardly rests in the side of the frame A, which in the embodiment shown is reinforced by an angle-iron $a''$. Thus it will be seen that the member G, with its bearing on bar H, may oscillate in a vertical plane, and consequently permit oscillation of the springs E' F' and as well the extremities of the forward and rear axle to which those springs are attached.

In a running-gear of this nature on which is superimposed a body, preferably of the lightest possible material, it is necessary that no strains be transmitted to that body and equally desirable that the interconnecting framing between the middle portions of the spring systems should not be subjected to unnecessary straining, especially of a warping tendency. Heretofore the running-gears of, generally speaking, this nature have embodied between the central portions of their spring systems interconnections rigidly attached to each spring for some distance, or at least two points on each spring, which has necessitated unduly heavy construction of such interconnections, preventing relative vertical flexibility of one spring system with respect to the other, or, on the other hand, if the interconnections were light the use of the vehicle and resulting flexing of the spring systems have imparted dangerous warping strains to the interconnecting framing, which is usually constructed with the intention of being rigid, gradually loosening the joints and connections of such framing and also disalining and in a general way seriously impairing the engine or other mechanism supported on that framing. In the construction as shown in the drawings forming a part hereof the frame A will have no warping strain transmitted to it when the vehicle runs over uneven ground—as, for example, when the forward end of E' is raised by the wheel at this end of the forward axle passing over a rise in the ground the whole spring system on the corresponding side of the vehicle will be raised, and though it assumes a different position in its vertical plane and throws one side of the frame A upward, this side of the frame being attached by the swivel, consisting of the bar H and the bearing J, will permit a relative tipping of the spring system, consisting of springs E' F' and bar G, and prevent relative distortion of side member a' and side member a of the frame. In this respect the functioning of a running-gear embodying my invention can be considered as a body or frame supported at three points on the two longitudinal spring systems—that is, the rigid attachment of the system on one side corresponds to a two-point attachment, or can actually be made a two-point attachment, while on the other side the one point, and that a swivel, permits a perfect articulation for all practical purposes without straining of any of the members beyond the entire spring system and the body. Due to the different angularity of the forward and rear axle when one corner of the wheel-base is raised there will be a slight torsional effect on the springs; but as they are long and for light vehicles are comparatively narrow it becomes practically unnecessary to make the connections between springs and axle such as to allow for this. In case of a heavy construction it is within the province of my invention to combine with the feature already specifically mentioned a swiveling construction in the connections of two or more of the junctions between springs and axles or a combination of joints including a slightly spherical bearing between the bar G and the bar H, as for some purposes it is desirable to have as many as possible of the connections between spring and axles rigid to resist the tendency of distortion in a horizontal plane from the rectangular shape of the running-gear. To still further resist this horizontally distorting tendency in cases where it may be desirable, an oblique bracing of the frame A from the neighborhood of the swivel-joint on one side to the bearings on the opposite side would suffice to entirely prevent any actual horizontal distortion.

It will be seen that instead of four separate springs the systems on either side could be made continuous from axle to axle without departing from the spirit of my invention.

It will be seen that whereas heretofore the distorting tendency due to the warping of the wheel-base has tended to warp and gradually rack the frame and body connections loose with my construction no such injurious effect results, and at the same time a lighter construction of frame is permitted and a lighter body may be safely mounted upon the frame without the chance of injury. The body may be constructed with the frame an integral portion to simplify the construction; but I prefer to embody my invention in a structure in which the frame, spring systems, axles, and, in fact, running-gear complete may be assembled and any desired form of body imposed thereon readily detachable for numerous reasons.

Though I have shown my invention as embodied in a special form of running-gear, I do not wish to limit myself to the details or arrangement as therein particularly shown, as various modifications or changes may be made while still embodying my essential features.

What I claim, and desire to secure by Letters Patent, is—

1. In a vehicle, forward and rear axle members, a longitudinal spring system on each side of said vehicle, a frame, one of said spring systems attached rigidly to said frame and the other loosely attached thereto.

2. In a vehicle, a forward axle member and means of suspension for individually-pivoted wheels on either end thereof, springs attached to said axle near either end, extending rearwardly and upwardly, a frame, one of said springs attached rigidly to said frame, the other spring pivotally attached thereto, springs extending rearwardly and downwardly from said frame, a rear axle member to which the latter are attached.

3. In a vehicle, front and rear axle members, a frame, a spring system extending longitudinally from axle to axle, and a pivotal connection between said spring system and frame, a second spring system connecting said frame with said axles, the means of engagement between said second spring system and frame coöperating to alone secure a stable support of said frame.

4. In a vehicle, two axle members, a frame or body member, two longitudinal spring systems extending from axle to axle, connections between said frame or body member and said spring systems, connections on one side being rigid, and the connections on the other side pivoted, substantially as and for the purpose described.

5. In a vehicle running-gear, the combination of front and rear transverse members, two longitudinal spring systems extending from one transverse member to the other, intermediate direct connections between said spring systems, including a single pivotal attachment on one side.

6. In a vehicle, a running-gear comprising two longitudinal spring systems, a supported frame or body, connections to one spring system whereby stability of said body or frame is secured, and connections to the other spring system whereby the relative oscillation of the spring system is permitted.

7. In a vehicle, a running-gear, the combination of front and rear transverse members, two longitudinal spring systems extending from one transverse member to the other, intermediate direct connections between said spring systems including a single pivotal attachment on one side, said frame or body constituting the sole interconnection between the spring systems whereby longitudinal movement of one spring system relative to the other is prevented.

8. In a vehicle running-gear, two transverse or axle members, two longitudinal spring systems extending from one to the other of said transverse members, a single transverse rod extending from one spring system to the other at their middle portions, said rod coöperating with a bearing on one of said systems whereby a free oscillatory motion in a vertical plane of one spring system with respect to the other is permitted.

9. In combination in a running-gear, a warpable rectangular structure comprising axles and longitudinal spring systems directly connecting the same, interconnecting means between the middle portions of said spring systems whereby the rectangularity of said structure is maintained, said interconnecting means consisting of a rigid frame, flexible connections between said frame and the warpable rectangular structure whereby no distortion or warping of the latter is transmitted to the former.

10. In combination in a vehicle, a substantially rectangular running-gear including longitudinal spring systems extending from axle to axle, a rigid frame, flexibly-supporting means between said frame and the middle portions of said spring systems whereby warping or distortion of said running-gear is not transmitted to said frame, said frame constituting the main interconnection between the longitudinal spring systems, and a readily-detachable body directly superimposed upon said frame.

This specification signed and witnessed this 17th day of January, A. D. 1903.

GEORGE HERBERT CONDICT.

In presence of—
FRED. VIEWEG,
HERMANN F. CUNTZ.